United States Patent [19]

Halford

[11] Patent Number: 4,807,121

[45] Date of Patent: Feb. 21, 1989

[54] PERIPHERAL INTERFACE SYSTEM

[75] Inventor: Robert J. Halford, Chippewa Falls, Wis.

[73] Assignee: Cray Research, Inc., Chippewa Falls, Wis.

[21] Appl. No.: 205,533

[22] Filed: Jun. 10, 1988

Related U.S. Application Data

[63] Continuation of Ser. No. 622,786, Jun. 21, 1984, abandoned.

[51] Int. Cl.$^4$ .............................................. G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,319,230 | 5/1967 | Astrahan et al. | 364/200 |
| 3,336,582 | 8/1967 | Beausoleil et al. | 364/200 |
| 3,400,372 | 9/1968 | Beausoleil et al. | 364/200 |
| 3,427,592 | 2/1969 | Bahnsen et al. | 364/200 |
| 3,432,813 | 3/1969 | Annunziata et al. | 364/200 |
| 3,564,502 | 2/1971 | Boehner et al. | 364/200 |
| 3,582,906 | 6/1971 | Beausoleil et al. | 364/200 |
| 3,623,155 | 11/1971 | Hsiao | 371/37 |
| 3,688,274 | 8/1972 | Cormier | 364/200 |
| 3,725,864 | 4/1973 | Clark et al. | 364/200 |
| 3,812,473 | 5/1974 | Tucker | 364/200 |
| 3,812,475 | 5/1974 | Christiansen | 364/200 |
| 4,300,193 | 11/1981 | Bradley et al. | 364/200 |
| 4,313,160 | 1/1982 | Kaufman et al. | 364/200 |
| 4,455,621 | 6/1984 | Pelley et al. | 364/900 |
| 4,460,959 | 7/1984 | Lemay et al. | 364/200 |

OTHER PUBLICATIONS

"M6800 Systems Reference and Data Sheets", Motorola Semi-Conductor Products, Inc., May 1975.
Preliminary Specifications: GTE 2114, S2114, 8104/8114 Static RAMs, GTE Microcircuits Division, 1980.
"Intelligent Standard Interface Specifications", SPEC 77653440, CD 6, REV B, Magnetic Peripherals, Inc., Apr. 30, 1982.
"Intelligent Peripheral Interface", Physical Level, Preliminary ANSI Working Document, X3T9.3/176 REV 7, Oct. 23, 1983.
"IPI Level 2 Disk Interface Preliminary Draft", Version 3.1, Jan. 6, 1984.
"Intelligent Peripheral Interface", Logical Level 3 for Intelligent I/O, Preliminary ANSI Working Document, X3T9.3/83-4, Rev. 2.0, Dec. 23, 1983.

*Primary Examiner*—Gareth D. Shaw
*Assistant Examiner*—Adolfo Ruiz
*Attorney, Agent, or Firm*—Merchant, Gould, Smith, Edell, Welter & Schmidt

[57] ABSTRACT

A peripheral interface system is disclosed. An input-output processor is provided to receive input-output commands from a central processing unit. Up to four multiplexing units may be connected to the input-output processor, with each multiplexing unit providing an interface for up to four controller units, which may be used to control a peripheral device. The multiplexing unit includes a pair of data buffers, each with its own addressing circuit, and each functionally divided into four storage areas, each storage area providing four registers to store four parcels of data. Data is transferred between the input-output processor and the controller units by filing the storage area in a buffer from the local memory of the input-output processor in a serial fashion over a DMA channel provided between the multiplexer and the local memory. Data transferred from the storage area in the multiplexer to a controller is sent one parcel every four clock periods, according to a scanner/time slot synchronization scheme between the multiplexer and the up to four controllers which may be connected thereto. Similarly, data parcels are transferred from the controller to the multiplexer on a scanner/time slot basis, and from the storage area of the multiplexer to the memory in a serial, consecutive fashion over the DMA channel. In operation, the buffers of the multiplexer are alternately filled and emptied such that one may be filling while the other one is emptying. A pair of buffers are also provided in the controller unit, which also may be alternately filled and emptied as between the peripheral device and the multiplexer.

10 Claims, 13 Drawing Sheets

FIG. 3

| REGISTER | | |
|---|---|---|
| 0 | PARCEL 0 | |
| 1 | PARCEL 1 | CHANNEL 0 |
| 2 | PARCEL 2 | |
| 3 | PARCEL 3 | |
| 4 | PARCEL 0 | |
| 5 | PARCEL 1 | CHANNEL 1 |
| 6 | PARCEL 2 | |
| 7 | PARCEL 3 | |
| 8 | PARCEL 0 | |
| 9 | PARCEL 1 | CHANNEL 2 |
| 10 | PARCEL 2 | |
| 11 | PARCEL 3 | |
| 12 | PARCEL 0 | |
| 13 | PARCEL 1 | CHANNEL 3 |
| 14 | PARCEL 2 | |
| 15 | PARCEL 3 | |

FIG. 4

| REGISTER | | PARCEL | |
|---|---|---|---|
| 0 | L.M. ADDRESS 0 | 0 | |
| 1 | L.M. ADDRESS 1 | 1 | CHANNEL 0 |
| 2 | INTERNAL (CONTROLLER) STATUS 0 | 2 | |
| 3 | EXTERNAL (DISK) STATUS 0 | 3 | |
| 4 | L.M. ADDRESS 0 | 0 | |
| 5 | L.M. ADDRESS 1 | 1 | CHANNEL 1 |
| 6 | INTERNAL (CONTROLLER) STATUS 1 | 2 | |
| 7 | EXTERNAL (DISK) STATUS 1 | 3 | |
| 8 | L.M. ADDRESS 0 | 0 | |
| 9 | L.M. ADDRESS 1 | 1 | CHANNEL 2 |
| 10 | INTERNAL (CONTROLLER) STATUS 2 | 2 | |
| 11 | EXTERNAL (DISK) STATUS 2 | 3 | |
| 12 | L.M. ADDRESS 0 | 0 | |
| 13 | L.M. ADDRESS 1 | 1 | CHANNEL 3 |
| 14 | INTERNAL (CONTROLLER) STATUS 3 | 2 | |
| 15 | EXTERNAL (DISK) STATUS 3 | 3 | |

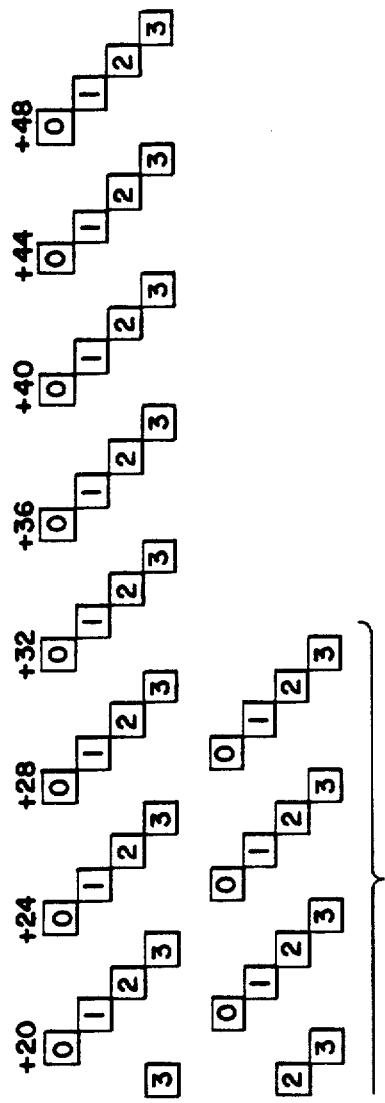
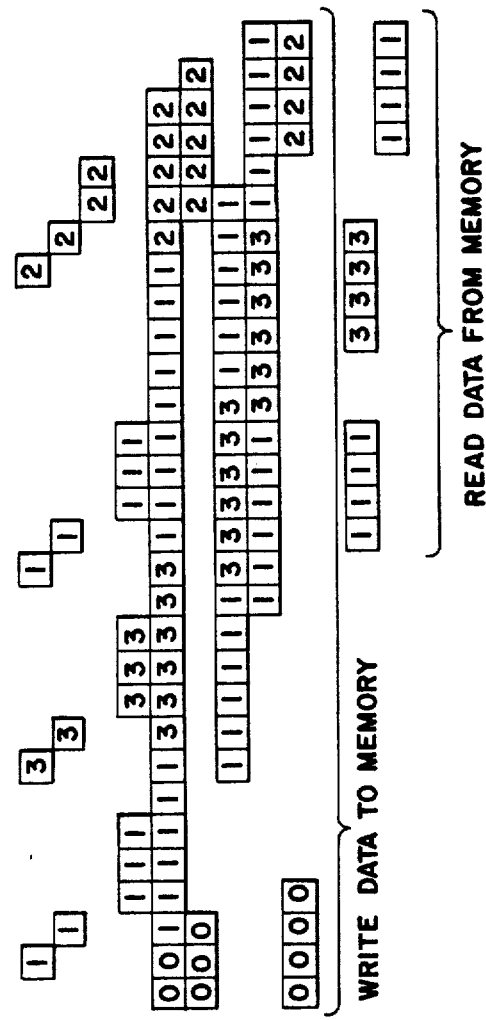
FIG. 7B ns to two or more relatively simple peripheral devices, in which case the peripheral devices can perform few, if any, operations independently of the multiplexed intelligence source. Another approach in the prior art has been to provide each peripheral device with relatively high level intelligence so that the devices, once instructed, require little or no supervision in carrying out an I/O function. The former approach has the advantage of centralizing the more expensive and sophisticated intelligence hardware, thus reducing the over system cost, but can limit the response time of peripheral devices controlled therewith, and, can be complicated in its implementation. The latter approach, of course, is more expensive to implement but is simpler in design (as multiplexing needs are reduced reduced or eliminated), but can result in redundant resources in the I/O system.

PERIPHERAL INTERFACE SYSTEM

This is a continuation of application Ser. No. 622,786 filed June 21, 1986, now abandoned.

TECHNICAL FIELD OF THE INVENTION

The present invention relates generally to the field of input-output systems for use with computers or related apparatus, and more particularly to a peripheral interface system in an input-output section of a data processing system.

BACKGROUND OF THE INVENTION

Modern mainframe data processing systems include central processing units (CPU), central memory directly addressable by the CPU, input-output (I/O) storage devices to enter data into and record data from the system, and I/O processing systems which control and buffer the movement of data between the I/O devices and the central memory. I/O processing systems relieve the CPU of directly controlling the I/O devices and permit data processing to proceed concurrently with I/O operations.

To permit I/O processing to proceed independently of data processing it is necessary that the central memory be directly addressable by the I/O processing system. Typically, direct addressing is accomplished by the I/O processing system through either sharing a direct memory address (DMA) port with the CPU, or by providing two or more DMA ports and dedicating at least one to the exclusive use of the I/O system. In either case, however, I/O data transfers to and from the central memory are typically limited to only a few, and often only one, central memory access path. The path or paths must be used efficiently, or else data processing speed can be sacrificed, particularly in large or fast data processing systems which require quick reference to large blocks of data scattered throughout a large library maintained in a plurality of peripheral storage devices. Thus to be effective an I/O processing system must not only be able to gain quick access to any one of a considerable number of peripheral devices and any one of many records stored in a particular device, but must also be able to move the data associated with each record to and from the central memory quickly and efficiently.

The above-described requirements for effective I/O processing systems dictate certain aspects of their design. For example, the central memory DMA port or ports must be multiplexed to provide a data channel to and from each peripheral device. This may be accomplished by at least two different techniques, or a combination of the two, one providing a plurality of independent data paths each servicing one peripheral device and hardware multiplexing these paths to the DMA port, or for another providing a shared data path servicing two or more peripheral devices on a time multiplexed basis.

I/O processing systems must also include at least enough intelligence to carry out specific I/O tasks without resort to the mainframe CPU. How much intelligence, and where the intelligence is implemented in the I/O system is a matter of great importance to the overall complexity, expense and flexibility of the I/O processing system. Some prior art systems concentrate I/O intelligence in one location and multiplex or distribute control information through one or more control channels to two or more relatively simple peripheral devices, in which case the peripheral devices can perform few, if any, operations independently of the multiplexed intelligence source. Another approach in the prior art has been to provide each peripheral device with relatively high level intelligence so that the devices, once instructed, require little or no supervision in carrying out an I/O function. The former approach has the advantage of centralizing the more expensive and sophisticated intelligence hardware, thus reducing the over system cost, but can limit the response time of peripheral devices controlled therewith, and, can be complicated in its implementation. The latter approach, of course, is more expensive to implement but is simpler in design (as multiplexing needs are reduced reduced or eliminated), but can result in redundant resources in the I/O system.

Another aspect common to most I/O processing systems is data buffering between the central memory DMA port and the peripheral devices. Buffering has several purposes, among them the synchronization of data transfers between the relatively slow peripheral devices and the relatively fast central memory, and the assembling or dissambling of data words as required by the different widths of data paths and the differing organization, i.e. 16-bit, 32-bit, etc. ...) of the central memory and peripheral devices. As may be readily appreciated there are a multitude of design possibilities for I/O processing systems using different degrees, types and combinations of multiplexing, intelligence and buffering. The ultimate objective being however in any case the provision of a flexible, efficient, managable, reliable and low cost I/O processing system capable of sustaining a relatively high I/O throughput. Two of the many possibilities may be seen in U.S. Pat. No. 3,432,813—APPARATUS FOR CONTROL OF A PLURALITY OF PERIPHERAL DEVICES—E.J. Annunziata et al, and U.S. Pat. No. 3,725,864—INPUT/OUTPUT CONTROL - Clark et al.

Annunziata et al discloses an I/O processing system in which, generally, a main multiplexing channel is interposed between the CPU (including the central storage or memory) and a plurality of control units each capable of directly controlling several I/O devices such as tape units or disk drives. The main channel provides a plurality of subchannels each for connection to a pair of control units and includes data registers and controls common to the subchannels, and a local storage for storing I/O commands or unit control words to be executed. Four selector subchannels are provided to interface with relatively high speed I/O devices such as "hyperspeed" tape units, and a multiplexer subchannel is provided to interface with relatively slow devices, such as card readers. The operation of one of the selector subchannels begins with the execution of a start I/O instruction by the CPU, which causes the main channel control to retrieve associated unit control words from the central memory and store the same in the local memory. The particular subchannel which interfaces with the I/O device for which the I/O instruction is intended is then activated to interlock with the device via the corresponding control unit. Thereafter, commands are transferred from the local storage to the control unit, which in turn controls the selected I/O device accordingly. In read operations 8-bit bytes are retrieved from the I/O device and assembled in the subchannel to form a 64-bit word. Once a word is assembled, it is immediately transferred to a second register and the subchannel requests access to the central memory for storage thereof. A similar but reverse process is employed in write operations. It should be noted that once a selector subchannel is interlocked with an I/O device it remains so until the entire I/O operation is completed. Thus, no more than four I/O devices may be operating via the selector subchannels at any given time, and only one of the plurality of devices interfaced through each selector subchannel may be accessed at a time. Of course, both of these limitations are less than desirable, and there are others, for instance highly desirable burst transfers of data to and from the central memory cannot be accomplished.

Annunziata's multiplexer subchannel can, however, operate all the peripheral devices attached thereto simultaneously. Peripheral devices connected to the multiplexer subchannel are placed in operation in the same manner as those connected to selector subchannels. However, once an I/O transfer is initiated, the unit control word or words are transferred from the channel back to local memory, whereby the multiplexer subchannel is free to operate other devices until the commanded device requires service, i.e. is ready to accept or produce a byte of data. At that point the unit control word or words are again transferred to the subchannel and the byte is either accepted or produced. In between service periods, the portions of the 64-bit word to be assembled from the peripheral device or dissambled for transfer to the device are stored in local memory. However, while the multiplexer subchannel design is viable for relatively slow devices, it is apparently unsuitable for faster devices, such as disk drive units.

Clark et al discloses an I/O processing system similar to that of Annunziata et al but of a more sophisticated design. For example, Clark et al employs cross point switching between a plurality of control units (each associated with different channels) and a plurality of I/O devices so that any one of the I/O devices may be accessed by any of the channels. This, of course, improves I/O processing flexibility over the system of Annunziata et al. Similarly, Clark et al discloses a system of device-control unit interfacing wherein a single I/O device is selectively interfacable to at least two different control units, which is also an improvement over the system disclosed in Annunziata et al. Aside from improved flexibility of device access through the available channels Clark et al also discloses an improved system for multiplexing channel control capability over time. Briefly, this system somewhat resembles the technique used in Annunziata et al to operate a plurality of slow peripheral devices through a single channel. Clark et al, however, extends that technique so that two or more channels may be multiplexed to service a plurality of devices wherein, for example, a first channel may be employed to initiate an I/O operation in a first peripheral device and then logically disconnected for use in servicing other peripheral devices during the latent period of the first device, and a second channel may be employed to control the first peripheral device when it again requires service.

Thus, the system of Clark et al provides for much greater flexibility in accessing peripheral devices by providing multiple channel access paths to each device and for more efficient utilization of available channel resources. The system is, however, much more complicated than that provided in Annunziata et al, both in terms of interconnection of the various channels, control units and peripheral devices and in terms of the quantity and sophistication of control hardware implemented. Also, Clark et al pays little heed to optimization of data handling both in terms of maximizing available I/O throughput potential and in terms of guaranteeing a short maximum response time to fetch or store data in any given I/O peripheral device.

The present invention, on the other hand, provides a switchless peripheral interface system which both maximizes hardware utilization and guarantees that all peripheral devices interfaced therethrough may be accessed in substantially the same amount of time, such that no peripheral device may monopolize the available I/O channels. Furthermore, I/O capacity is provided such that all peripheral devices may transfer data simultaneously at substantially maximum capacity under typical operating conditions, so that maximum throughput is limited primarily by the number of peripheral devices implemented, and not by available I/O channel resources. In addition, buffering requirements are held to a minimum through three or more stages of synchronized buffers distributed between the peripheral device storage medium and the mainframe CPU, and the pairing of buffers in certain components of the system. Moreover, the peripheral interface system of the present invention employs intelligent control logic in virtually all components of the interface system, with the intelligence being synchronized to operate in a highly coordinated and efficient manner.

SUMMARY OF THE INVENTION

According to the present invention there is provided a peripheral interfacing system for a data processing system including a central processor having a central memory and a plurality of peripheral devices. The peripheral interfacing system includes I/O processor means including a local memory having at least one DMA port for transmitting and receiving data and including accumulator means for transmitting and receiving control information. Channel multiplexer means are provided for communicating with the DMA port and the accumulator means to provide a plurality of data and control information channels between the DMA port and the accumulator means and a corresponding number of peripheral devices.

The channel multiplexer means includes address-status buffer means including a plurality of registers for holding local memory address parcels and peripheral device status parcels, the registers being function-wise divided into groups, one group for each of the channels. First and second data buffers are also included and provide a plurality of registers for holding data parcels, the registers being function-wise divided into groups, one group for each of the channels. A first multiplexing means communicates with the accumulator means and the peripheral devices for multiplexing address and status parcels into and out of the address-status buffer means and peripheral device control information from the accumulator means to the peripheral devices. A second multiplexing means communicates with the DMA port and the peripheral devices for multiplexing data parcels into and out of either of the first and second data buffer means from or to either of the DMA port or the peripheral devices. A third multiplexing means issues I/O processor channel commands to the peripheral devices. Control logic means are included and are divided functionally into a plurality of channel logic sets, each one of the sets controlling the data flow through a corresponding channel, one set functionally active at a time on a revolving time multiplexed basis for controlling the first, and second and third multiplexing means and addressing the buffer means to cause different ones of corresponding channel groups of registers of said first and second data buffer means to fill and empty alternately so that during an active period of a channel logic set one channel data buffer group may be filling while the corresponding channel data buffer group may be emptying, said filling and emptying occurring between different ones of said local memory DMA port and one of said peripheral devices, and to permit said accumulator means and said peripheral devices to reference said address-status buffer means.

According to another aspect of the invention, there is provided a plurality of controller means each one communicating with one of the peripheral devices and with the channel multiplexer means. Each of the controller means includes first and second data buffers which each include a plurality of registers for holding data parcels. Data multiplexing means is provided and communicates with the channel multiplexer means and the one peripheral device for multiplexing data parcels into and out of the first and second data buffers from or to either of the one peripheral device or the channel multiplexer means. Control logic means is also provided and communicates with the channel multiplexer means and the one peripheral device for controlling the data multiplexing means and addressing the buffer means to cause the first and second data buffer means to empty and fill alternately so that one may be filling while the other emptying, the filling and emptying occurring between different ones of the channel multiplexer means and the one peripheral device.

According to still another aspect of the invention, the controller means is functionally active to communicate with the channel multiplexer means periodically on a revolving time multiplex basis, with the channel multiplexer means initiating the active communication period therebetween.

According to yet another aspect of the invention, a predetermined plurality of data parcels are transferred between the channel multiplexer means and the controller means during each communication period.

According to still another aspect of the invention, a frequency of occurrence of communication periods between the channel multiplexer means and the controller means is fixed so that the filling or emptying of one of the first and second data buffers from or to the channel multiplexer means normally proceeds at a rate exceeding the rate of filling or emptying of the other of the data buffers to or from the one peripheral device.

According to yet another aspect of the invention, the one peripheral device transmits and receives data parcels in streams, the streams each comprising a predetermined plurality of data parcels, one of the streams transferred between the controller means and the one peripheral device in response to a single request signal generated by the control logic means, and the first and second data buffers are sized to hold a predetermined plurality of streams.

According to still another aspect of the invention, the control logic means includes first and second addressing controls for referencing the first and second data buffers with the first and second addressing controls being multiplexed to either of the buffer means via first and second address multiplexers associated with the first and second data buffers respectively. One of the addressing controls provides references for data parcels transmitted to or received from the one peripheral device and the other of the addressing controls provides references for data parcels transmitted to or received from the channel multiplexer means.

According to still another aspect of the invention, the data parcels are communicated between the data multiplexing means and the one peripheral device through a "BUS-IN" parallel data path carrying data parcels from the one peripheral device to the data multiplexing means and a "BUS-OUT" parallel data path carrying data parcels from the data multiplexing means to the one peripheral device.

According to still another aspect of the invention, the data parcels are communicated between the data multiplexing means and the channel multiplexer means through an output parallel data path carrying data parcels from the data multiplexing means to the channel multiplexer means and an output parallel data path carrying data parcels from the channel multiplexer means to the data multiplexing means.

BRIEF DESCRIPTION OF THE DRAWING

FIG. 3 is an illustration of register usage in the multiplexer unit according to the present invention;

FIG. 4 illustrates other register usages in a multiplexer unit according to the present invention;

FIGS. 5A, 5B, 6A, 6B, 7A and 7B are timing diagrams of read and write operations by the multiplexer unit according to the present invention;

DETAILED DESCRIPTION OF THE INVENTION

Overview

Figure 1:
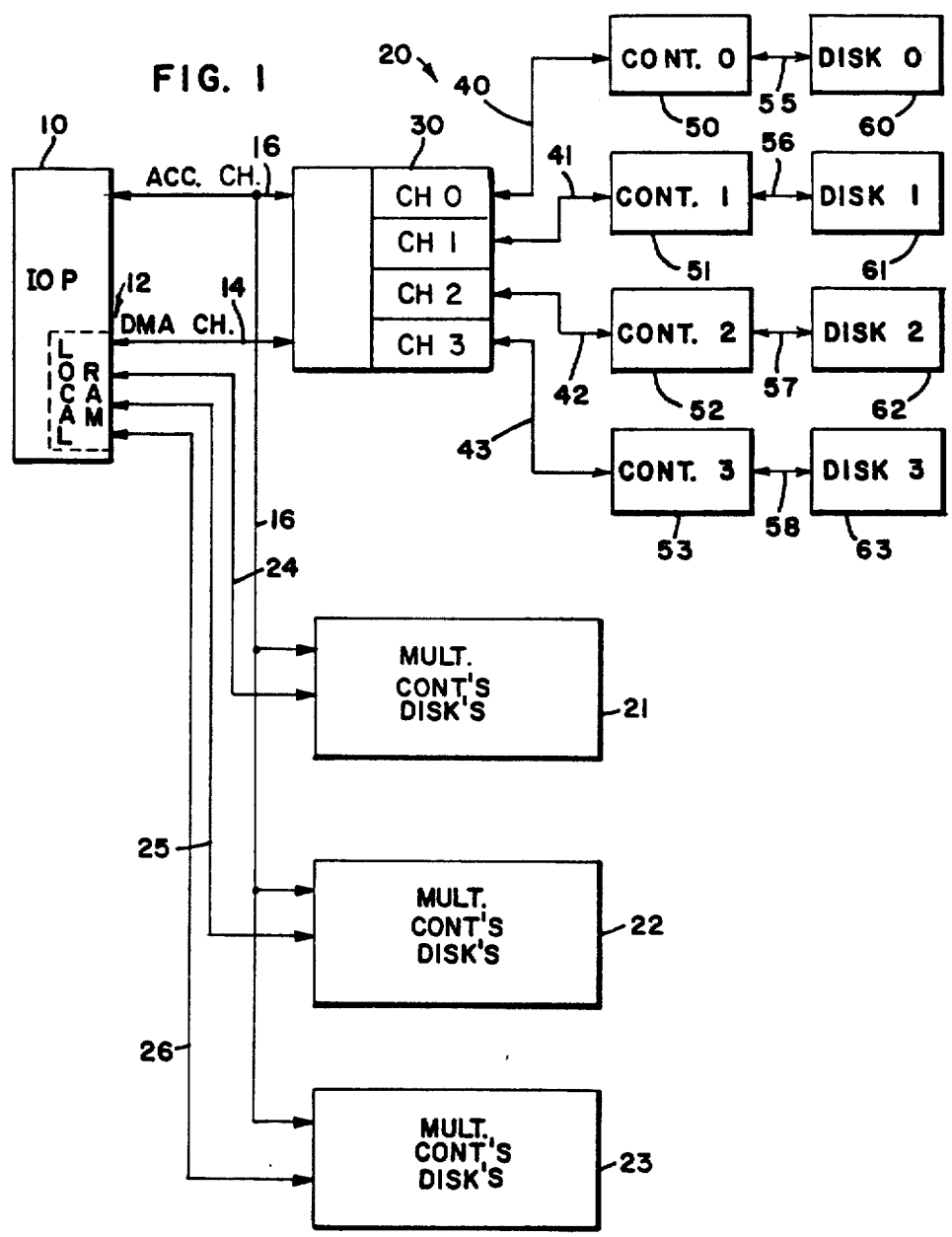
FIG. 1 is a conceptual block diagram of the preferred embodiment of the peripheral interface system of the present invention.

A conceptual overview of the preferred embodiment of the peripheral interface system of the present invention is illustrated in block diagrammatic form in FIG. 1. An input-output processor (IOP) 10, including a RAM memory, is provided to perform certain input-output tasks for a CPU—central processing unit—(not shown), for example the reading and writing of data to and from disk drive units 0–3, designated by reference numerals 60–63. The RAM memory of IOP 10, hereinafter referred to as the "local or RAM" memory, is connected via one of direct memory access (DMA) ports 12 through a DMA data channel 14 to a channel multiplexer 30 which in turn is interfaced to disk drives 0–3 through the respective controller units 0–3, designated by reference numerals 50–53. Another channel, accumulator channel 16, is provided to convey instructions, commands, parameters, etc. from the accumulator register of IOP 10 to multiplexer 30.

Multiplexer 30, controller units 50–53 and disk drive units 60–63 comprise an I/O subsystem 20. As shown, IOP 10 may be interfaced with up to four such subsystems. Subsystems 21, 22 and 23 may be interfaced to IOP 10 via the respective DMA channels 24, 25 and 26 and accumulator channel 16, which is connected in a parallel fashion to each connected multiplexer.

Preferably, IOP 10 is a fast, 16-bit multipurpose computer capable of transferring data at extremely high rates through its local RAM memory (preferably of a fast bipolar design) as it passes between the peripheral devices and the CPU. All communications with the mainframe, such as disk and tape requests or station communications, are preferably handled by a second "master" IOP (not shown), which works in conjunction with IOP 10 where requests to peripheral devices under the control of IOP 10 are involved. Also not shown but preferably employed in conjunction with IOP 10 and the master IOP is a relatively large buffer memory communicating with the central memory through a 100M byte/second channel. In operation the IOP 10 controls the movement of data between the mainframe's central memory and the buffer memory through the channel. In read and write operations to peripheral devices IOP 10 transfers data between its local memory and the buffer memory and between its local RAM memory, via the DMA channels, and peripheral devices interfaced therewith, such as disk drive units 0–3. It shall be understood, however, that while the above described system of input-output processors and memories is preferred it is not essential to the present invention.

Conceptually, channel multiplexer 30 may be thought of as being segregated into four hardware channels 0—3, each of which "channel" data, instructions and related parameters between the IOP 10 and a corresponding controller (0–3) and drive unit (0–3). Thus, for the purpose of conceptual illustration, there are shown four individual multiplexer 30 channels (0–3) and interface paths 40–43 between multiplexer 30 and controller units (0–3). However, as will be seen hereinafter, in actual practice a single information path is shared among controllers 0–3, with access to multiplexer 30, and thereafter IOP 10, provided on a time multiplexed basis.

Controller units 0–3 are each dedicated to the respective ones of disk units 0–3, and are connected thereto via interface paths 55–58, respectively. The primary function of each controller unit (0–3) is to buffer data between the multiplexer 30 and a 64-parcel FIFO deskew buffer within a corresponding one of drive units 0–3. To buffer data, each of controllers 0–3 includes a pair of parcel buffers which attempt to lead or lag the disk during write and read functions respectively. Data is transferred to and from the corresponding disk unit deskew buffer in multiple-parcel streams. It shall be understood that for the purpose of this description and the appended claims the term "parcel" has equivalent meaning to the term "word" and denotes a parallel group of a predetermined number of data bits.

Each of disk drive units 0–3 include independent controls for the timing of internal read and write operations, for instance the reading and writing of data to the disk. Thus, the only time dependent operation over the interface paths 55–58 is the actual transfer of data and parameters (e.g. functions). In a write mode, the deskew buffer of a drive unit (0–3) receives data from a corresponding controller (0–3), and then transfers it out for storage on the disk platters in synchronization with the internal disk unit clock. Similarly, in a read mode data is clocked from the platters into the deskew buffer, utilizing the internal disk clock, and transferred out of the deskew buffer to a controller.

Channel Multiplexer

Figure 2:
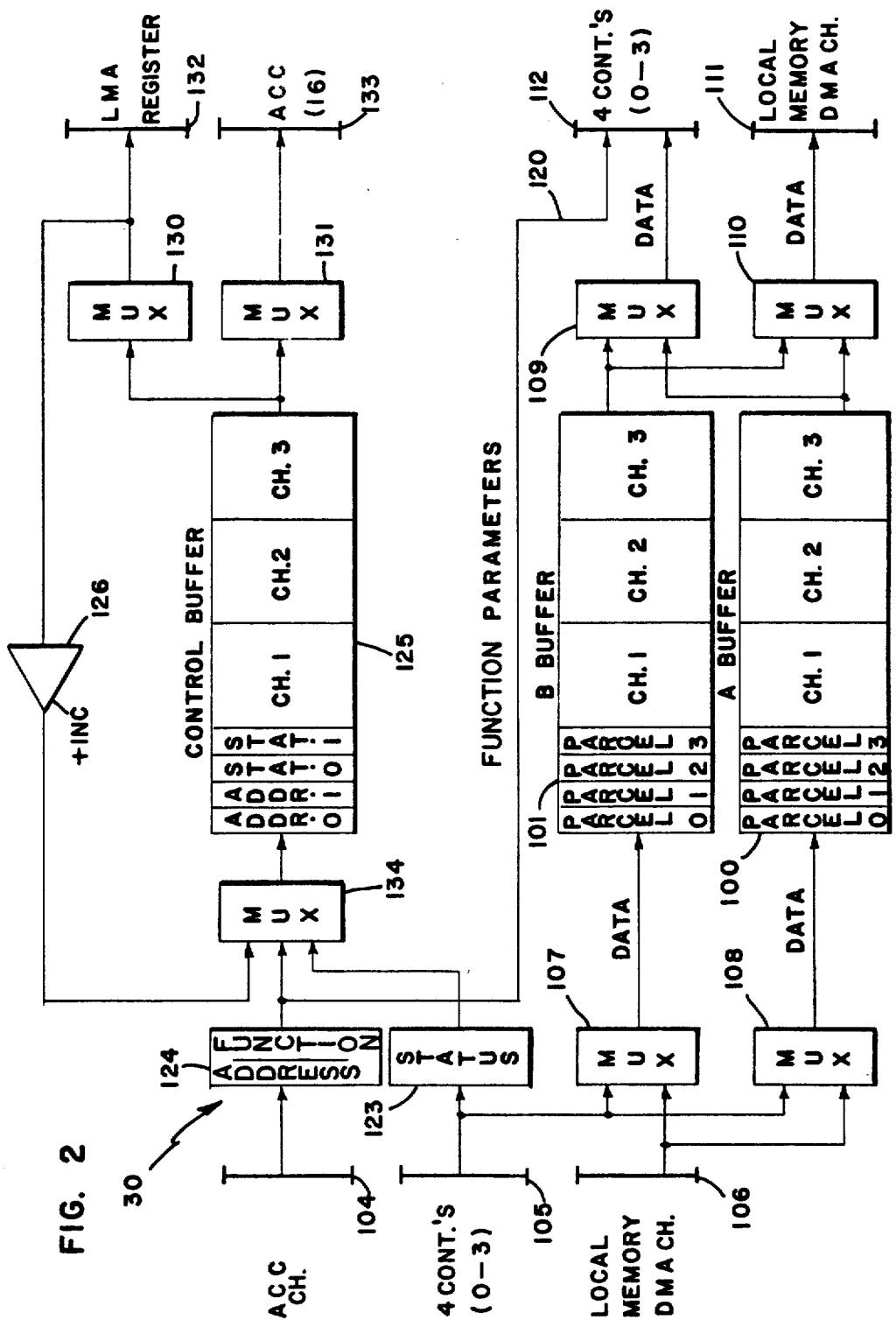
FIG. 2 is a simplified schematic block diagram of a multiplexer unit according to the present invention.

The system as outlined broadly hereinabove will now be described in more detail, beginning with reference to FIG. 2, which shows the multiplexer 30 of subsystems 20–23 in simplified schematic block diagram form. As hereinabove mentioned, the principal function of multiplexer 30 is to multiplex data between an IOP DMA port and up to four disk controller units (0–3). Besides buffering the data between the local memory and the controllers, multiplexer 30 manages a pair of local memory addresses, a pair of status registers, busy and done flags, and interrupts for each one of controllers 0–3.

Two data buffers A and B, 100 and 101 respectively, are shared between all four channels for staging data to and from IOP 10 local memory. Each buffer 100 and 101 hold four parcels of data for each of channels 0–3 (i.e. the information paths between the IOP 10 and the controllers) as shown for example with respect to channel 0 of each buffer.

IOP 10 local memory address and function information enters at input 104 from the accumulator channel 16, is buffered through register 124, and is entered in the control buffer 125 through multiplexer 134 (address information), or is passed along to controller output 112 (controller/drive functions). Local memory addresses (LMA's) are multiplexed out to the IOP's local memory address register when needed as will be explained below in more detail. Similarly, drive status parameters conveyed from the controller units (0–3) enter at input 105, are buffered through register 123, and are stored in the control buffer 125. When requested, they are delivered to the IOP 10 accumulator channel 16 via multiplexer 131 and output 133.

Control logic, discussed below in more detail, provides for simultaneous read and write operations to different disks. The control logic for multiplexer 30 is divided functionally into four sets of logic, one set for each of the four possible channels and drives 0–3, which are synchronzied to multiplex data flow among the channels. Synchronization of the four controller units 0–3 through the multiplexer enables them to time share the DMA channel to and from the IOP 10.

As illustrated, buffers 100, 101 and 125 are segmented into four storage areas, one for each channel and each under the control of one logic set. As illustrated in more detail in FIG. 3, each of buffers 100 and 101 include 16 registers (four per channel), denoted 0–15 each holding a 16-bit data parcel. The organization of control buffer 125 may be seen in more detail with reference to FIG. 4. Controller buffer 125 includes sixteen registers denoted 0–15, four for each of channels 0–3. The registers retain two local memory address parcels, 0 and 1, an internal (controller) status parcel, and an external (disk) status parcel, per channel.

Between multiplexer 30 and the local memory data is transferred in groups of four parcels, with each group associated with a lone channel, such that each transfer either completely fills or completely empties the four registers allocated to a particular channel in one of the A or B buffers. For instance, in a transfer of parcels for channel 0 from A buffer 100 to local memory, the four parcels (0–3) held in that channel's registers are clocked in a serial fashion out of A buffer 100, through multiplexer 110, and out output 111 over the DMA channel 14 to the local memory. And, for instance, in a transfer of parcels for channel 3, from local memory to the B buffer 101 data parcels are received in a serial fashion at input 106 over DMA channel 14, directed through multiplexer 107, and stored in the four parcel registers associated with channel 3.

Between multiplexer 30 and a controller, however, parcels are transferred on a time multiplexed scanner basis, at most one every four clock periods per channel. Thus, for example, to fill channel 0's four parcel registers in the A buffer, at least fourteen clock periods are required, given a one clock period delay from the clock period the multiplexer requests a parcel and the storage of that parcel in a parcel register. Likewise, at least fourteen clock periods are required to empty four parcels for a particular channel from a buffer.

Figure 5A:
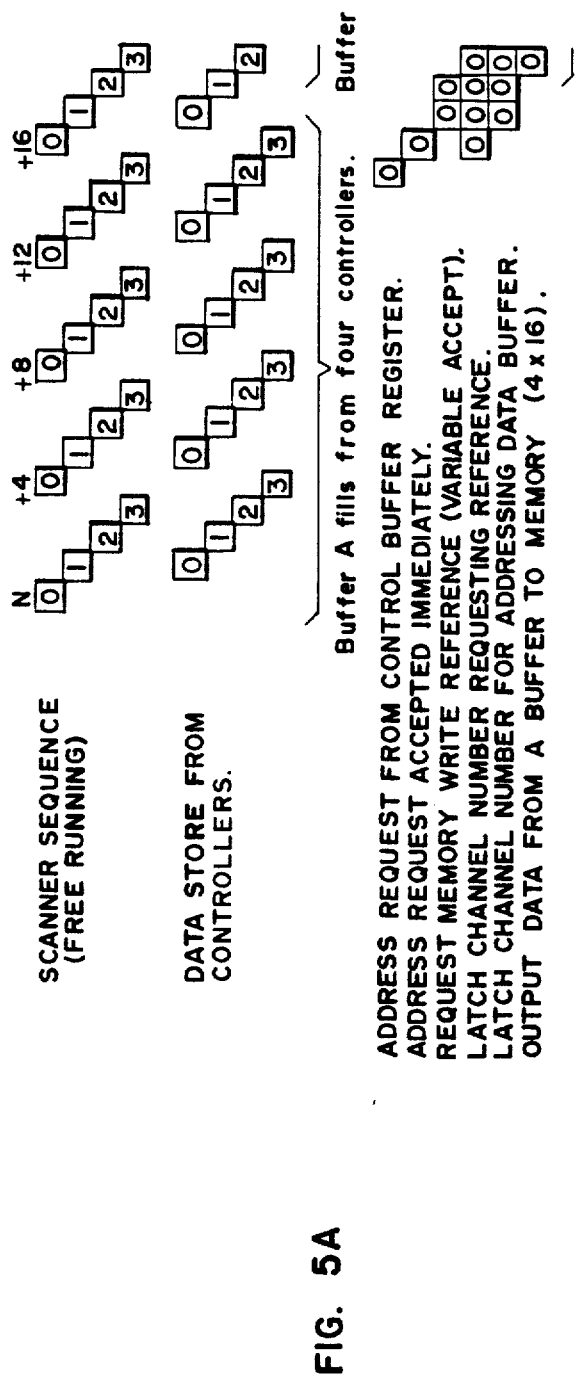
Figure 5B:
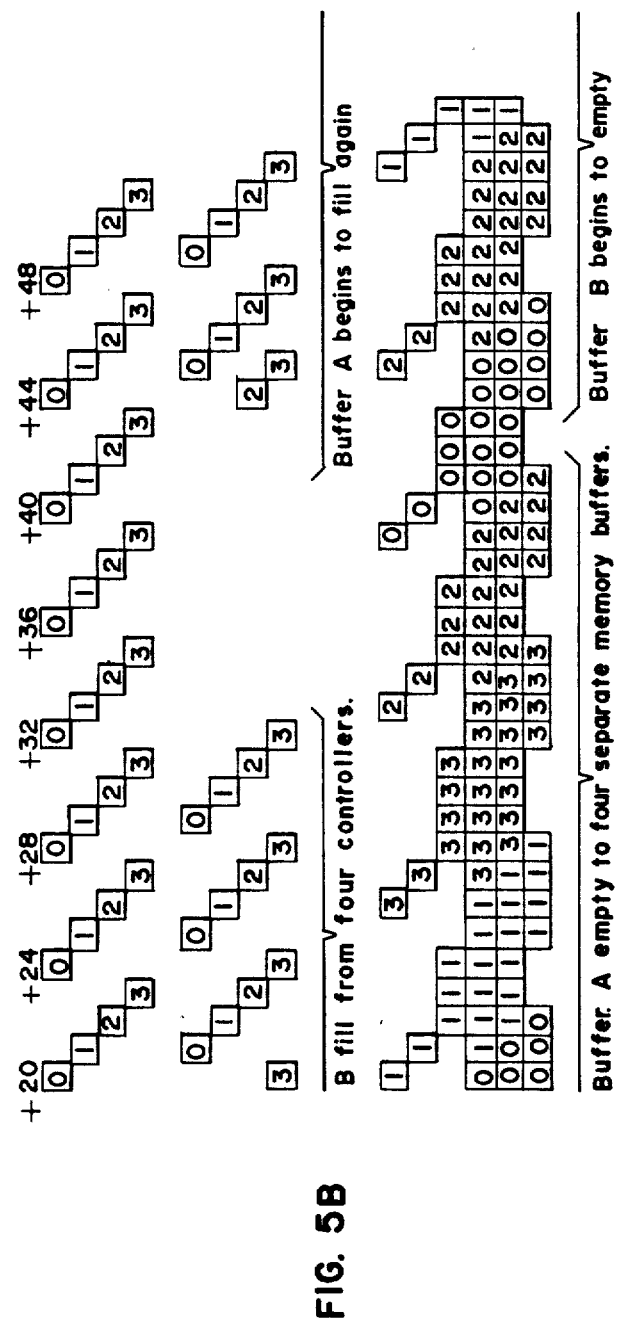

Referring to FIGS. 5A and 5B, which when laid side by side form a single timing diagram showing the illustrative, although as a practical matter unusual, case of the multiplexer reading from all four channels concurrently. Multiplexer 30 includes a scanner, which provides the 0-3 scanner sequence for the multiplexing data and function parcels between itself and the four controllers which share its input 105 and output 112. The scanner signals are thus provided to each controller interfaced with the multiplexer to indicate to a controller what clock period it may send or accept information parcels. In the example of FIG. 5 (buffers initially empty), between clock period N and N+16, the A buffer 100 is filled with sixteen data parcels, four from each controller. For instance, at a clock period N, the sequence scanner signals controller 0 to produce a data parcel (if available), and at clock period N+1 a first data parcel is stored from controller 0, via imput 105 and multiplexer 108, into the channel 0 parcel group of A buffer 100. Thus, at a clock period N+13 the four A buffer channel 0 parcel registers are filled, the channel 1 registers at period N+14, channel 2's at N+15, and channel 3's at N+16.

As soon as a channel's parcel group is full in one buffer, for instance buffer A in this example, the other channel group in the other buffer, if empty, is filled. For example, in the case shown in FIG. 5, the filling of the B buffer groups begins at period N+17, at which point in time, incidentally in this example, all four channel parcel groups have been filled in the A buffer.

Whenever a particular parcel group is filled, the multiplexer will seek to transfer the parcels to the local memory as soon as possible. For instance, in the example of FIG. 5 the process of emptying the buffer A channel 0 group to the local memory begins at clock period N+15, as synchronized to respond to scanner sequence slot "2" at period N+14. This two clock period "offset" of the synchronization of local memory transfer logic operations holds true for all local memory transfer operations, and is provided in order that memory transfers may be initiated, if other conditions so indicate, as soon as possible after a complete emptying or filling of parcels associated with a particular channel in a buffer.

The process of emptying a channel group for a buffer begins, for instance, as shown with respect to channel 0, buffer A, beginning at clock period N+15, with a request to the control buffer register 125 for a local memory address (LMA). In the example, this address request is accepted immediately at clock period N+16 such that at clock period N+17 a local memory address has been multiplexed through multiplexer 130 and is prepared to be output to the local memory address register at output 132. Simultaneously, a local memory write reference request is presented, which in turn is accepted in a variable fashion, depending on the availability of the memory for the operation. In the instant example, the request is accepted immediately, such that data is transferred from the channel 0 parcel group of the A buffer to the memory in four consecutive periods beginning at the period N+19. Thus, from the period N+19 to the period N+22 four sixteen bit data parcels are transferred from the buffer A channel 0 group to the memory. After a reference request has been accepted, the corresponding LMA is incremented via incrementor 126 and multiplexer 134. Thus, the LMA will be properly advanced for the next memory reference when need be. This operation, of course, is also followed in the case of transfers from the memory to the buffer, as will be discussed below.

As illustrated, the process of emptying the channel 1 group of the A buffer may be commenced prior to the completion of the transfer of the parcels from the channel 0 group of that buffer. Thus, at a clock period N+20, the memory transfer logic, synchronizing from scanner slot "3" at clock period N+19, recognizes that the channel 1 parcel group is filled and that a transfer process may be initiated. Due to the overlapping nature of these operations, there is provided a pair of latches in the logic which permit the logic to "remember" the channel number associated with a yet to be completed operation whilst a new channel is serviced, so that parcels may be directed in and out of the A and B buffers to and from the correct channel areas thereof. Because both buffers may be active simultaneously, one reading out data and the other storing it, the final stage of the latch is copied to provide one for each buffer, such that each buffer has access to the stacked channel number. Thus, the channel number requesting the reference to memory is latched in a first register, in this example, beginning at a clock period N+16 (when the memory reference request is presented), and the channel number is advanced to a second latch, which may be read for the purpose of addressing the data buffer, at a clock period N+17. Additional addressing being provided for pointing to the appropriate parcels (0-3) within a group.

As the maximum DMA memory reference rate permits a reference every six clock periods, a next memory reference is not permitted to proceed for at least two clock periods following the acceptance of a memory reference request, as may be seen, for example, with respect to the sequence of events following the request acceptance at clock period N+24 for channel 1 and at clock period N+31 for channel 3. Thus, once a request is accepted, four sixteen bit words are transferred within the next five clock periods. Thus, if the clock period is T, and the maximum memory rate is a reference every 6T, then the I/O rate per channel can approach 16/6T bits per second for sixteen bit data parcels.

At clock period N+32 it will be seen that the B buffer has been completely filled, but that, however, the entire A buffer has yet to empty to the local memory. Thus, from the time period N+32 to the time period N+41, no parcels are accepted from the controllers, as local memory operations to a buffer monopolize the addressing logic for the buffer such that all other buffer operations are suspended. At clock period N+42, however, it will be seen that a parcel is accepted from controller 2 and deposited in the channel 2 group of buffer A. From that point on, buffer A is filled in the same manner as discussed above, only that the last two parcels deposited in the buffer in this instance would be from controller 0 and controller 1 respectively.

Just as buffer A begins to fill again as soon as it is empty to the memory, it shall be seen that buffer B begins to empty to the memory as soon as the A buffer has been emptied, provided that the B buffer, or at least one channel group from that buffer has been filled. Thus, at clock period N+39, the process of emptying the B buffer and in particular channel 0 thereof, is initiated.

Thus, it may be seen from the case illustrated if FIG. 5, that in the case of a multiplexer read operation from all four channels consists of the filling of the first buffer from the controller, the emptying of that buffer to the local memory while the other buffer is filled, and so on and so forth.

Figure 6A:
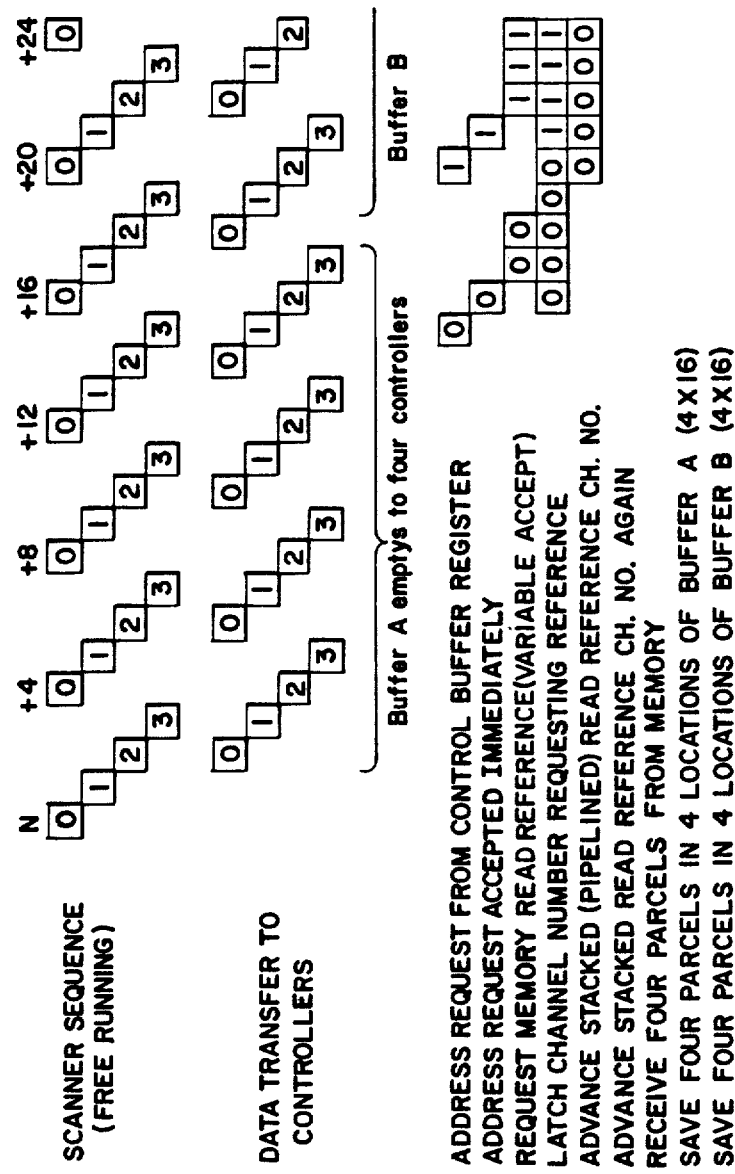
Figure 6B:
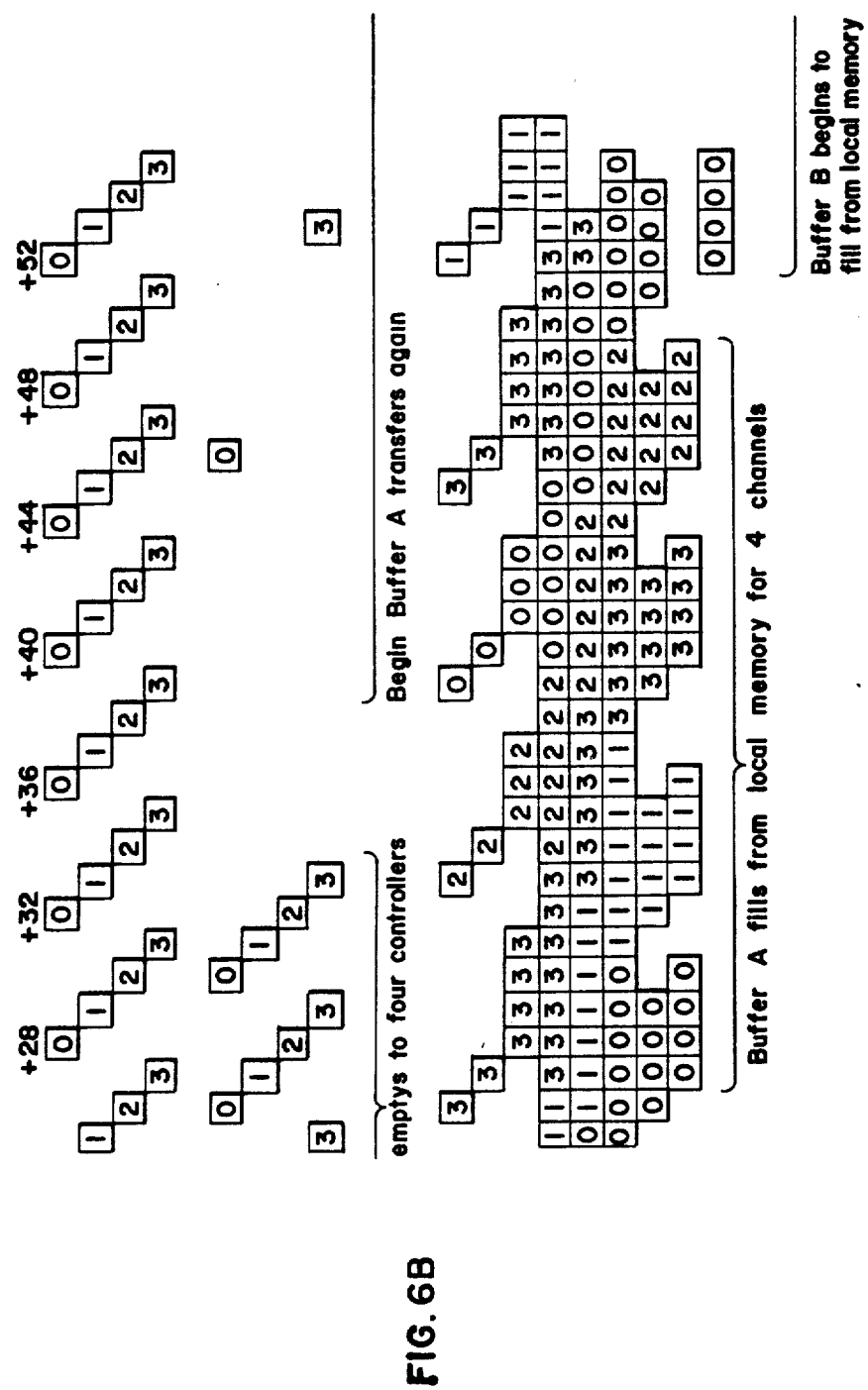

Referring now to FIGS. 6A and 6B, which when laid side by side form a single timing diagram, the case of a synchronous multiplexer writing to all four channels is illustrated. In the case of this example, the diagram begins with the A and B buffers full, as they would have been previously filed from the local memory. Thus, in a very similar fashion to the operation of filling the buffers from the controllers, the A buffer is emptied to four controllers from clock period N+2 to clock period N+17, as initiated by the scanner slots beginning at clock period N and continuing to clock period N+15. As shown, a data parcel is transferred from the multiplexer to a controller on the second clock period following the scanner slot signal to that controller. As a point of clarification, the previous example of FIG. 5 showed the occurrence of the acknowledge and data store in the buffer, which happen to occur on the same clock period.

At a clock period N+14, it will be seen that the process of emptying the channel 0 group of the A buffer to controller 0 has been completed, and that the process of filling that buffer from the local memory may be initiated. Thus, like in the case of the above discussed read operation, memory transfer logic operations are synchronized to the scanner sequence plus two channels such that at the scanner channel 2 slot at clock period N+14 the logic determines whether or not the channel 0 parcel groups are full in either buffer, and may be transferred to the local memory, which is the case illustrated in FIG. 6. Thus, at clock period N+15, an address request from the control buffer register 125 is made which request is shown as being accepted immediately by the control buffer. It shall be understood, however, that in the case of conflicting requests to the control buffer, for example for status information or functions output to the controllers, that address requests may be delayed.

Once the address request is accepted and control buffer 125 is prepared to present the appropriate address to a local memory address register of the local memory via output 132, a memory read reference request is made, in the instant case at clock period N+17. At a clock period N+18, the request is accepted, which in turn, inevitably leads to the receipt of four parcels from the memory for the channel 0 group of buffer A beginning at a clock period N+26 and ending on clock period N+29, which parcels are stored in the four locations of the channel 0 buffer A group beginning at clock period N+27 and ending at clock period N+30.

As in the case of a read reference, a channel number requesting a reference and a read reference channel number must be latched or "stacked", due to the overlap of logic operations, as may be seen in the illustration. For instance, the process of filling the four locations of buffer A allocated to channel number 3 is initiated prior to the completion of the transfer of parcels and storage of those parcels in the A buffer for channel 0, as initiated at clock period N+15. However, an additional level of stacking is required in the case of filling the buffers from the local memory, due to inherently longer delays from the initiation of a memory read reference to the completion of one. Thus, the channel number requesting a read reference from memory is latched when the reference is first presented, advanced to a second latch when the read acknowledge is received (not illustrated) from the IOP, and finally to a third latch six clock periods later, at which point any previous read from local memory to the buffer would be complete. The third latch may thus be accessed for pointing the buffer addressing to the proper channel group, with individual parcel (0–7) addresses supplied by another address control. Again, as in the case of the writing to local memory operations, independent latches are provided for each buffer.

Also pertaining to the overlap of read operations in local memory, it shall be understood that the speed of multiplexing of data from the memory to the buffers is limited by the speed at which data is produced by the local memory and transferred to the multiplexer. Thus, certain improvements in speed are possible with faster memory reference rates. It may be observed, however, that as in the case of the read operation, the maximum DMA rate is one reference every six clock periods, such that if the clock period is T and the maximum memory rate is a reference every 6T, then the I/O rate per channel can approach 16/6T for sixteen bit data parcels.

As shown in the example of FIG. 6, once the A buffer is empty at the time N+17, the emptying of the B buffer is commenced, and the filling of A buffer from the local memory proceeds simultaneously therewith. At the clock period N+33, the B buffer has been emptied to the controllers, such that the control logic attempts to locate any available data parcels from the A buffer (actually either buffer) that may be moved to a controller. Thus, at clock period N+34, the logic checks the channel 2 group in buffer A and determines that that group has yet to be filled from memory, and thus cannot be moved. A similar check is initiated for the channel 3 group at clock period N+35, and a similar determination is made. At the clock period N+36, the control logic determines that the channel 0 group in the A buffer is full and that a parcel could be transferred to the channel 0 controller, if the A buffer is not busy with a memory reference operation, which it is in this case. Thus, the channel 0 parcel cannot be transferred out to the channel 0 controller. The same process is repeated for the channel 1 group of the A buffer. However, as indicated by the dashed lines for channels 2 and 3, words from those groups are not yet available, and thus no words could be transferred during the clock period N+40 and N+41, even if the buffer were not busy. It will be observed, however, that parcels from channels 0 and 3 are moved to their respective controllers at clock periods N+46 and N+53, respectively, as data is available and a memory reference is not occurring at those times.

Referring again to the filling of the buffers from the memory, it may be seen that at a clock period N+39 the process of filling the channel 0 group of buffer B from the local memory is initiated, and that such operation is completed at the clock period N+55. Thus, as in the case of a read operation, the buffers ultimately empty to the controllers and are filled from local memory. With the process of emptying and filling each buffer independently controlled for each channel group of the buffers, as may be seen better with respect to the case of mixed reading and writing operations as illustrated in FIGS. 7A and 7B.

Figure 7A:
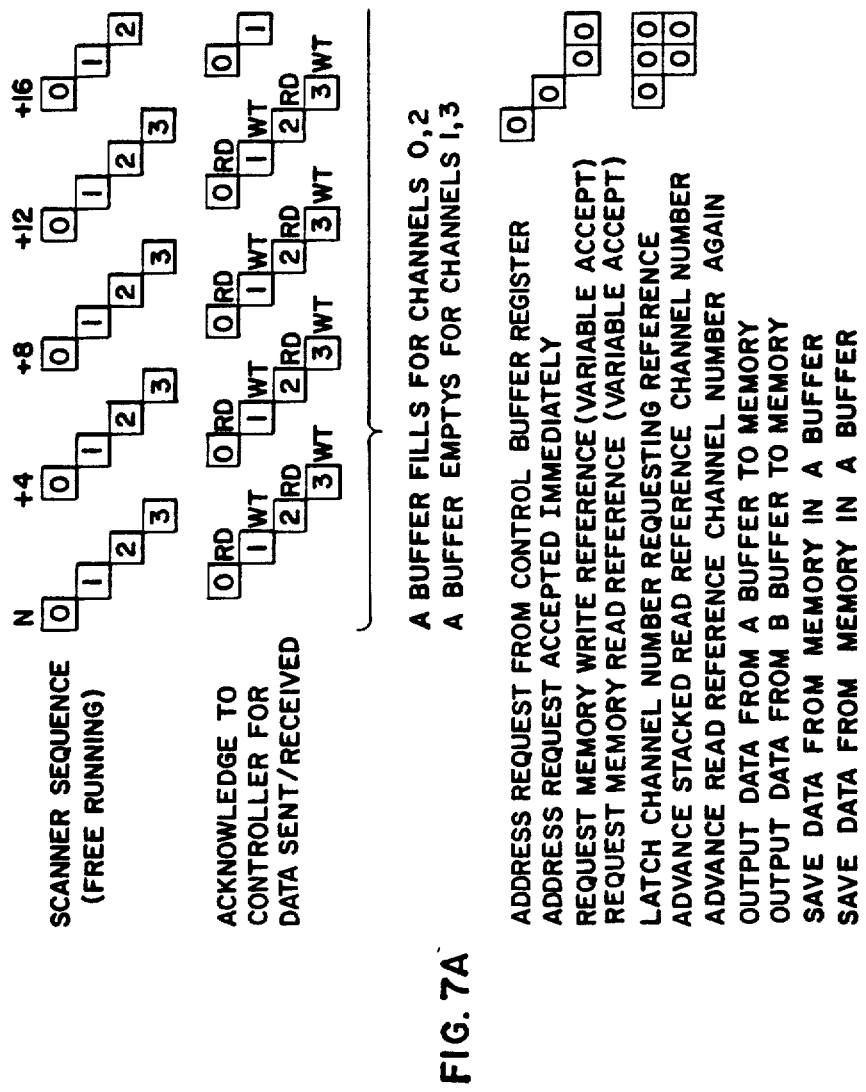

From the clock period N+1 to the clock period N+16 in the operation shown in FIGS. 7A and 7B (together which form a single diagram), the channel 0 and channel 2 groups of the A buffer are filled by a read operation from their respective controllers. With that read operation, the A buffer for channels 1 and 3 are emptied in a write operation to the respective controllers 1 and 3. Thus, at the clock period N+16, channels 0 and 2 in the A buffer are full and are thus ready to be emptied to the local memory, while the channels 1 and 3 of the A buffer are empty and require filling from the local memory. At the clock period N+17, operations switch to the B buffer for all four channels and the B buffer for channel 0 and 2 are filled while the channels 1 and 3 are emptied. It shall be understood, however, that the multiplexer of the present invention is capable of further mixing of operations as between the buffers, although such capability is not demonstrated in the examples. For instance, in the case shown in FIG. 7, the control logic of the present invention is capable of filling the A buffer for channels 0 and 2 whilst emptying the B buffer for the same or different channels, in an interleaved fashion, such that on the first clock period a read operation may be accomplished to fill the channel 0 group of the A buffer and on the next consecutive clock period a write operation may be accomplished to a different channel in the B buffer, and so forth. In any event, the control logic of the multiplexer continually seeks to accomplish the transfer of data between the multiplexer and a controller, and will make a transfer whenever possible, whether it is a read or write, and irrespective of which buffer is prepared for a transfer.

Thus, the case of FIG. 7 is a relatively straight forward mix of operations in that the sixteen consecutive transfers occurring between the clock period N+1 and clock period N+16 all occur to the same buffer and likewise from the period defined by clock period N+17 to N+32. In any event, at the clock period N+15 it may be seen that the control logic recognizes that a write operation from the channel 0 A buffer to the memory may be initiated, and such is accomplished.

Similarly, at the clock period N+20 the controller recognizes that the channel 1 A buffer is empty and mus4 be filled from the memory, and that process is initiated at that clock period. It shall be observed, however, that the initiation of the reference associated with channel 1 of the A buffer is not permitted to proceed until the previous reference has been accepted, as holds true for all transfer operations between the buffers and the memory. Thus, after the write reference request for channel 1 of the A buffer is accepted at the clock period N+24, the next available channel in the scanner sequence is that for channel 3, which process of filling that channel group is thus initiated at the clock period N+26.

After the write reference request for channel 3 is accepted at the clock period N+30, the control logic again attempts to find the next available channel group for a reference to memory, which may be maintained in the scanner synchronous sequence. Thus, at the clock period N+31 (as mentioned above at least a one clock period delay must be introduced between the acceptance of a reference request and the initiation of the subsequent transfer process) the control logic looks to channel 1 of both the A and B buffers, determines that channel 1 of the A buffer is involved in a memory transfer operation, but that channel 1 of the B buffer requires a fill from the local memory and thus at the clock period N+32, the process of filling the channel 1 group of the B buffer from local memory is initiated, which operation is completed at the clock period N+48.

Referring finally to the last illustrated memory transfer operation illustrated, it may be seen that at the clock period N+41 the process of emptying channel 2 of the B buffer to memory is initiated. Thus, as shown, the control logic of the present invention is capable of performing simultaneous operations in different buffers. It should be noted, however, that these simultaneous operations in the buffers are not equivalent to simultaneous memory reference operations. Reference operations are always performed sequentially. However, due to certain delays between the memory and the receipt of data by the multiplexer, data may actually be transmitted over the DMA channel in different directions simultaneously.

Thus, as may be seen from above, the following rules of transfer must be accomplished by the logic: (1) each reference must be acknowledged before a subsequent reference is permitted to proceed; (2) a parceling of data to and from the controllers is always accomplished synchronously with the scanner time slots; (3) if data is being moved between the buffer and the memory, the controller must be locked out from that entire buffer; (4) the channel numbers associated with each reference must be stacked in order to accommodate the concurrent procession of memory references.

Also incumbent in the operation of the multiplexer 30, although not obvious from the above examples, is the prioritizing of access to the control registers as follows ("1" has highest priority):

1. Program (software) load of LMA 0 or 1 or status read by IOP.
2. Incrementing LMA after reference.
3. Reference LMA request.
4. Status store from controller.

Like the reading and writing of data to and from the controllers, function information transferred between the multiplexer and a controller is synchronized to the free running scanner. As mentioned above, that information is staged in register 124 and passed along to output 112 at the appropriate slot time. Thus it can take up to four clock periods to clear a function from the multiplexer to a controller, such that the IOP 10 is restricted (by software) from presenting functions more than every five clock periods.

Not shown but included in the interface between the IOP 10 and multiplexer 30 are request read and request write lines from the multiplexer to the IOP 10 local memory, which the control logic of the multiplexer exercises when necessary as shown in FIGS. 5, 6 and 7 (request memory read reference, request memory write reference). Also, corresponding signal lines are provided from the IOP 10 to the multiplexer to signal the acknowledgement of a read or write request, as also referred to in FIGS. 5, 6 and 7. Similarly, interrupt lines (one for each channel) are provided from multiplexer 30 to IOP 10 to signal the completion of a local memory reference operation. Relatedly, following each interrupt, IOP 10 verifies the proper completion of a reference by reading the LMA register associated with the reference, and checking that the address has assumed the anticipated final setting.

Controllers

Figure 8A:
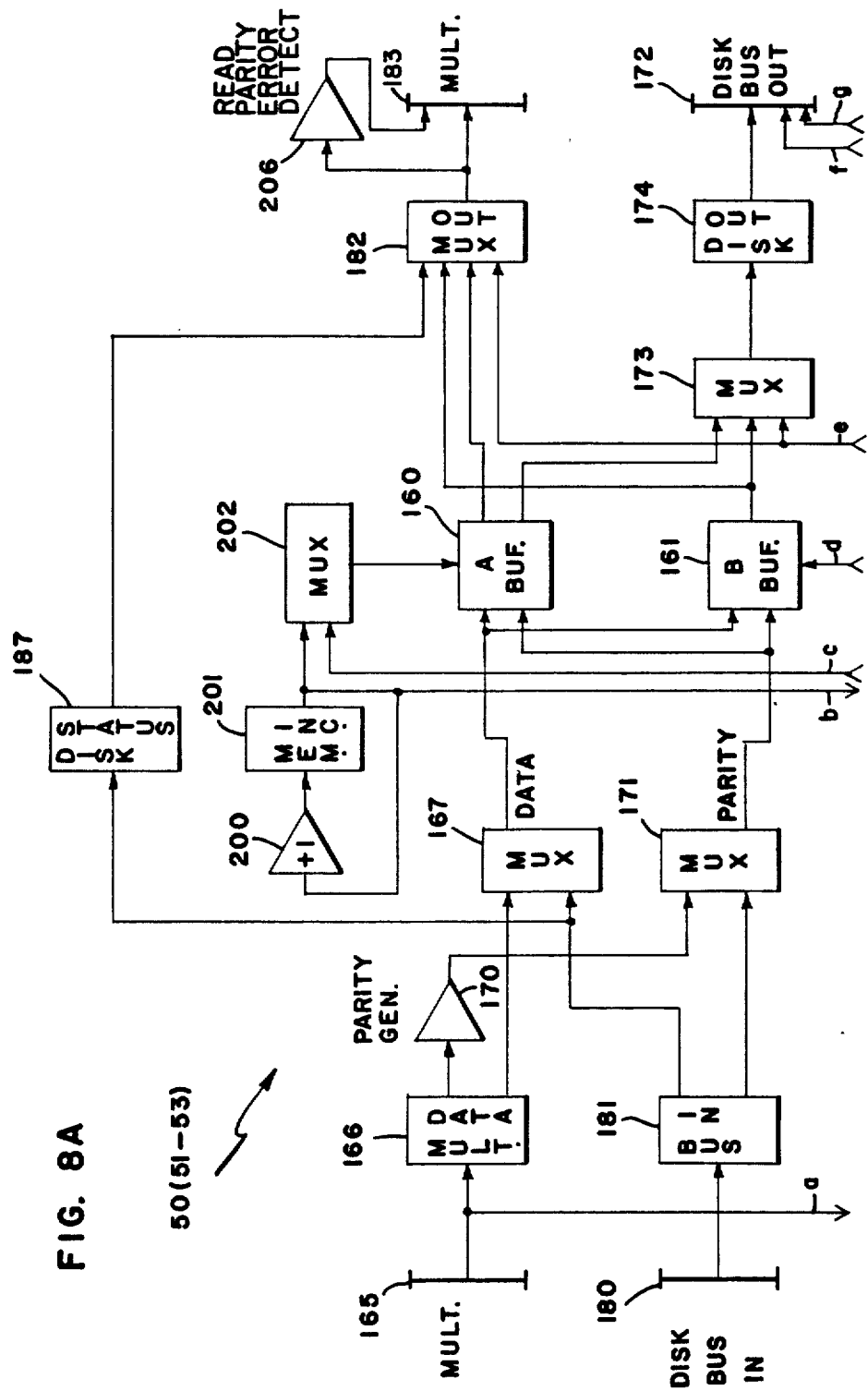
FIGS. 8A and 8B comprise a simplified block diagram of a controller unit according to the present invention.
Figure 8B:
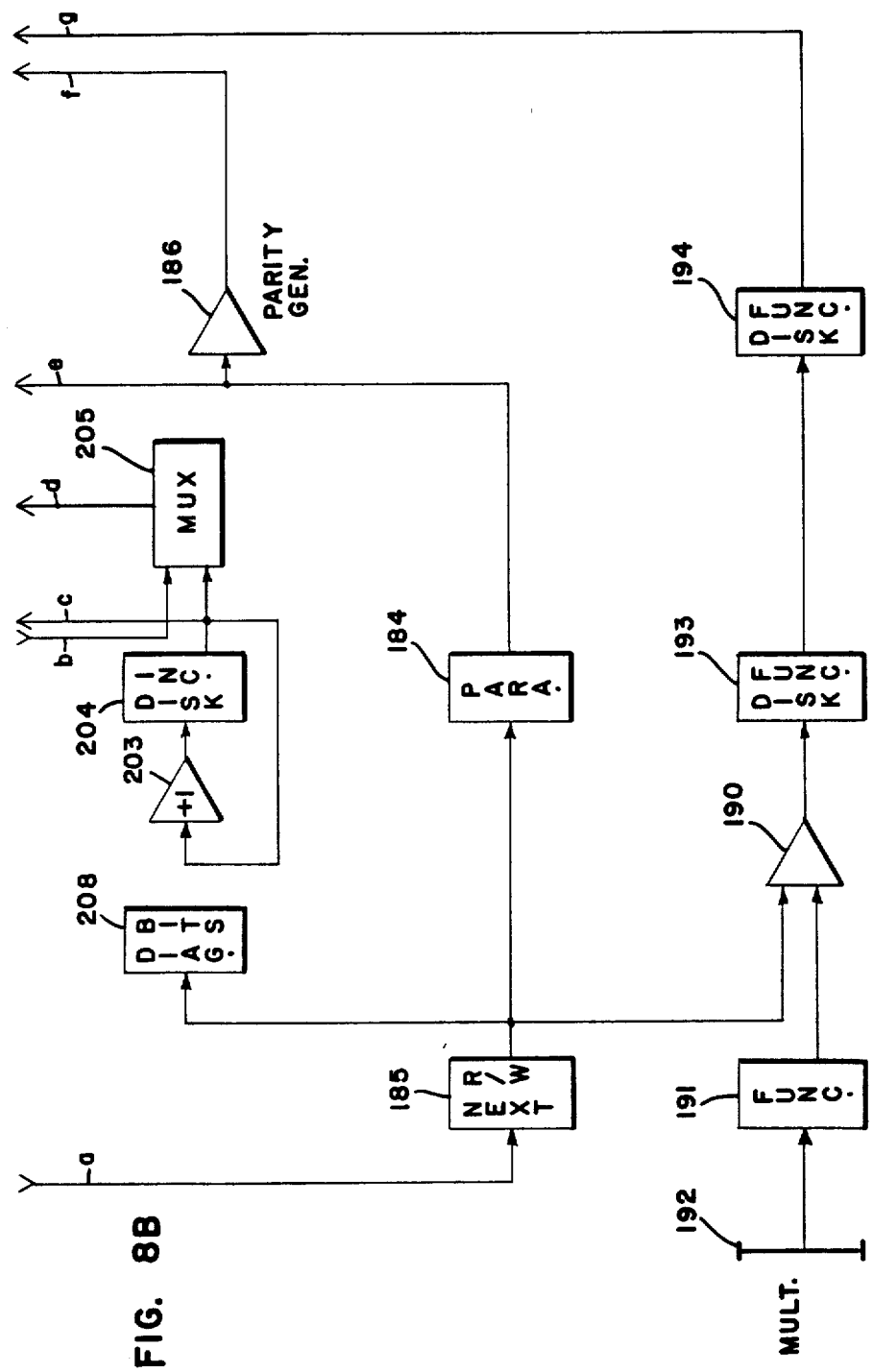

FIGS. 8A and 8B, laid side by side, form a simplified schematic block diagram of one of controllers 0-4, with the interconnection of the corresponding conductors indicated by the lower case alpha characters a through g. As described briefly hereinabove, a controller unit (0-3) has as its primary function the buffering of data between multiplexer 30 and a 64-parcel FIFO deskew buffer within a corresponding disk drive (0-3). A pair of buffers A and B, 160 and 161 respectively, each 17-bits by 512 parcels, attempt to lead or lag the disk during write or read functions respectively. Sixteen of the bits comprise a data word, with the seventeenth bit constituting an odd parity bit.

Preferably, data is transferred to and from the disk in sixteen parcel packets (i.e. 256 data bits per packet) with a single request or resume signal per packet. Each controller unit (0-3) is connected to its corresponding disk drive unit (0-3) through a pair of cables, which provide the BUS-IN and BUS-OUT information paths. In the case of a write operation to a disk drive unit, data from the multiplexer 30 is received at input 165, passes through a multiplexer input register 166 and a multiplexer 167, and is transferred to one of either of A or B buffers 160 and 161. Odd parity for input data is generated at parity generator 170 and multiplexed at 171 to the corresponding one of buffers 160 and 161 receiving the transferred data. When the drive is ready to accept data, the write data leaves buffers 160 and 161 and exits on the BUS-OUT cable at output 172, being directed through multiplexer 173 and disk out register 174. In the case of a read data operation, data from the disk is inputted at 180 from the disk BUS-IN cable and is directed through the BUS-IN register 181 through multiplexer 167, with the parity bit passing through multiplexer 171, to a corresponding one of either of A and B buffers 160 and 161. On command from the multiplexer 30, the read data passes from buffers 160 and 161 through the output multiplexer 182, and through to the multiplexer 30 output 183. A read parity error detector 206 is provided to verify the parity of data parcels, and to produce a signal indicative of proper or improper parity to multiplexer 30, which may abort data transfers when an error is sensed.

As described with reference to multiplexer 30, control parameters, for instance sector designating bits, share the information path between the multiplexer 30 and the controller units 0-3. These parameters, like data, are inputted at input 165, but are then entered into parameter registers 184 and 185. Control parameters residing in register 184 are multiplexed out through multiplexer 173 and disk out register 174 to the disk BUS-OUT cable at output 172, along with a parity bit generated by generator 186. The next READ/WRITE parameter register 185 is provided for implementation of a "continue" function available in disk drive units 0-3 which enables the next disk drive function to be queued in a multiple sector read and write operation. Thus, a controller (0-3) may, without resort to an IOP 10 interrupt, command a disk drive unit (0-3) to perform a read or write operation in accordance with the instruction held in READ/WRITE parameter register 185. By this mechanism the response time to a sector interrupt is not the inter-sector gap time on the disk but an entire sector time, about 370 microseconds for the disk drives utilized in the present embodiment. In connection with the continue function, the second LMA stored in control buffer 125 of multiplexer 30 is utilized for the local memory addressing, such that both the multiplexer 30 and controller are prepared to continue without resort to the IOP 10.

Disk function codes, for example read, write, head select and cylinder select, may be conveyed to the controller via either input 192 or input 165. Codes received at input 165 are directed through next READ/WRITE parameter register 185 while codes received at input 192 proceed through registers 193 and 194, to be transferred to the disk function input lines via the disk BUS-OUT cable at output 172 in synchronization with the corresponding parameters residing at parameter registers 184 and 185. Disk status, as entered in the control buffer 125 of the multiplexer 30, is also directed through controllers 0-3 via an input 180, bus-in register 181, disk status register 187, multiplexer out register 182 and output 183.

Addressing for A and B buffers 160 and 161 is provided for by addressing logic 200-205. A register 201 provides a buffer address for data received from or destined for the multiplexer 30. A register 204 provides a buffer address for data received from or destined for a disk drive unit (0-3). Register 204 is incremented via adder 203 in synchronization with each parcel read from or written to a disk drive unit. Register 201 is incremented via adder 200 in synchronization with each parcel sent to or received from the multiplexer 30. Multiplexers 202 and 205 are provided to gate the addresses of registers 201 and 203 to either of buffers 160 and 161, respectively.

In operation, A and B buffers 160 and 161 fill and empty alternately to ferry data between a disk drive unit (0-3) and the multiplexer 30. For example, a read operation from a drive unit commences with the filling of a buffer 160 with 32 packets of data (i.e. 512 parcels), A buffer 160 addressing being provided via register 204. Once the A buffer 160 is full, data from the disk is directed to B buffer 161. Contemporaneously with this switch, the A buffer 160 commences transferring its data to the multiplexer 30 under control of address register 201. When the B buffer 161 is full and A buffer 160 empty, the B buffer contents are transferred to multiplexer 30 and the A buffer filled from the drive unit, and so on until the entire read operation is finished, which in the present embodiment entails the transfer of 128 packets of data.

Write operations proceed in the same manner as read operations, only they begin with the filling of A buffer 160 with data from the multiplexer 30. Under normal circumstances, the disposition of data to the multiplexer 30 proceeds at a rate exceeding the rate of data received from a drive unit, and, conversely, multiplexer 30 may provide data at a rate exceed the maximum rate of transfer to a drive unit. Thus, in a write operation, a controller (0-3) requests data as needed from the multiplexer 30 to keep pace with the transfer of data to a drive unit. And, in a read operation a controller (0-3) attempts to send data to the multiplexer 30 to keep pace with the receipt of data from a drive unit. However, in certain circumstances a controller cannot dispose data to or acquire data from the multiplexer 30 to keep pace with the transfer of data from or to the drive unit platters. Accordingly, the drive unit's deskew buffer may be employed to provide an additional margin of time to accomplish the emptying or filling of A and B buffers 160 and 161.

A diagnostic mode bits register 208 is provided to allow forced parity errors to the drive and to the buffers 160 and 161 of the controller under user control.

Peripheral Devices

Figure 9:
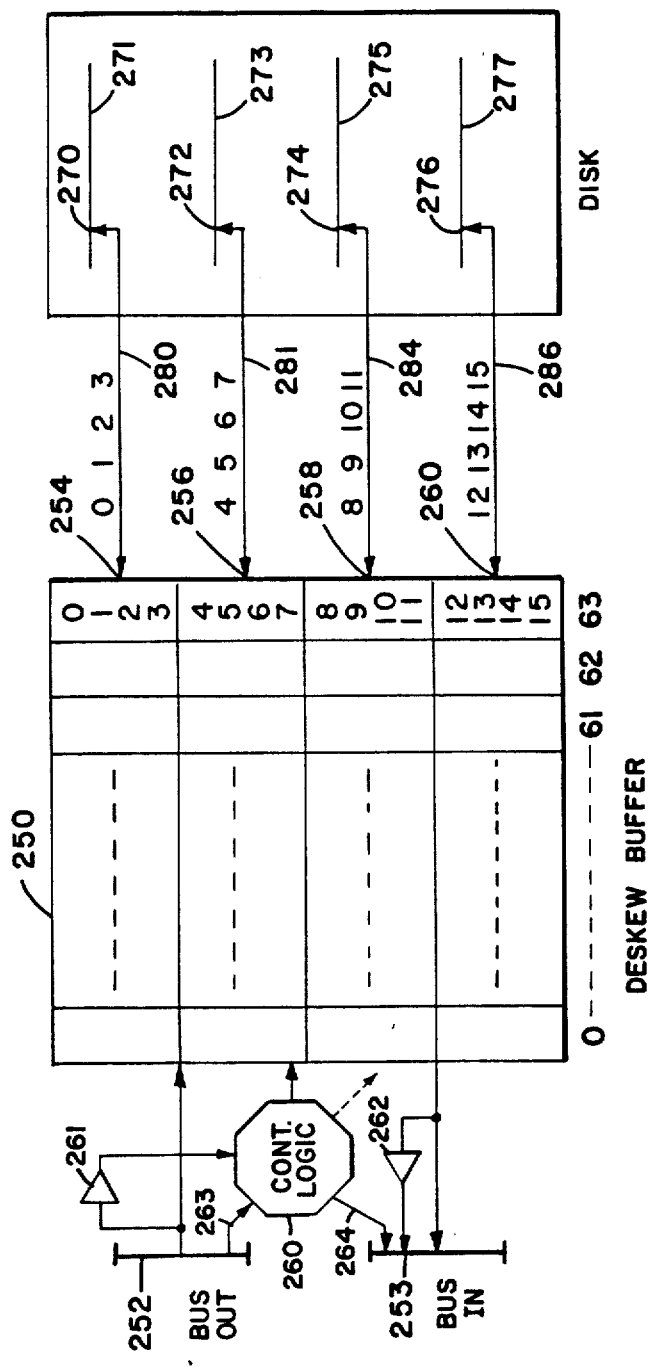
FIG. 9 is a simplified block diagram of a disk drive unit according to the present invention.

Referring to FIG. 9 there is illustrated in simplified conceptual schematic form the deskew buffer system of one of the disk drive units 0–3, which constitute the peripheral device implemented in the present system. It shall be understood, however, that the invention is not limited to application with disk drive units. Deskew buffer 250 is capable of buffering 64 16-bit parcels in a read or write cycle of the drive unit (0–3). For instance, in a read operation data is read from platters 271–277 via heads 270–276 in a serial fashion, the first four bits (0–3) being read via head 270, the next four bits (4–7) via head 272 and so on such that bits 0, 4, 8 and 12 are read from the platters substantially at once, then bits 1, 5, 9, 13 and so forth. Each group of four bits are assembled into parallel four bit words along each of paths 280–286 and are thus inputted into buffer 250 at input/outputs 254–260 in a parallel fashion to form a sixteen-bit parcel (0–16). Parcels are thus transferred from the platters 271–277 to to buffer 250 until a read operation is complete. However, as a read (or write) operation entails transferring 2,048 parcels from the platter to buffer 250 at a substantially uniform rate, buffer 250 transfers data parcels out to the controllers at output 253 on a first-in first-out basis asynchronously with data inputted at inputs 254–260. In the present embodiment, data output from buffer 250 is done in synchronism with a clock signal generated by control logic 60, sixteen parcels at a time, in a single transfer operation initiated in response to a single request or resume signal from a controller. Thus, 128 such transfer operations, i.e. packet transfers, are required to complete a 2,048 parcel or "record" transfer.

Write operations to the disk units are accomplished in much the same manner as read operations, only in reverse. Data parcels from a controller (0–3) are transferred to buffer 250 via input 252, clocked through the buffer and output at input/outputs 254–260, and serialized along paths 280–286 for serial writing to platters 271–277 via the respective heads 270–276. However, contrary to that suggested in FIG. 9, the data bits are in reverse order.

Control logic 160 is provided in each drive unit and receives commands and parameters via signal path 263 from a controller unit in order to control buffer 250 and the various other components of the drive unit. In addition, control logic 260 monitors parity of incoming data via parity detector 261 by which altered data may be aborted. Relatedly, parity generator 262 generates an odd parity bit for each parcel transferred from buffer 250 to the BUS-IN cable. Control logic 260 also monitors the drive's operation and generates drive status signals to be delivered to the controller via signal path 264 and the BUS IN cable.

Although the present invention has been described herein in its preferred embodiment, those skilled in the art will recognize that various modifications could be made thereto without departing from the spirit and scope of the invention as set forth in claims appended hereto.

What is claimed is:

1. A peripheral interfacing system for a data processing system including a central processor having a central memory and a plurality of peripheral devices, said peripheral interfacing system comprising:

I/O processor means including a local memory having at least one DMA port for transmitting and receiving data and including accumulator means for transmitting and receiving control information;

channel multiplexer means communicating with said DMA port and said accumulator means and providing a plurality of data and control information channels for data flow between said DMA port and accumulator means and a corresponding number of peripheral devices, said channel multiplexer means including:

(a) address-status buffer means including a plurality of registers for holding a local memory address parcel and a plurality of registers for holding a peripheral device status parcel, said registers functionwise divided into groups, one group for each of said channels;

(b) first and second data buffers each including a plurality of registers for holding data parcels, said registers function-wise divided into groups, one group for each of said channels;

(c) first multiplexing means communicating with said accumulator means and said peripheral devices for multiplexing address and status parcels into and out of said address-status buffer means and peripheral device control information from said accumulator means to said peripheral devices;

(d) second multiplexing means communicating with said DMA port and said peripheral devices for multiplexing data parcels into and out of either of said first and second data buffer means from and to either said DMA port or said peripheral devices; and (e) control logic means divided functionally into a plurality of channel sets, each one of said sets controlling the data flow through a corresponding channel, one set functionally active at a time on a revolving time multiplexed basis for controlling said first and second multiplexing means and addressing said buffer means to cause different ones of corresponding channel groups of registers of said first and second data buffer means to fill and empty alternately so that during an active period of a channel logic set one channel data buffer group may be filling while the corresponding channel data buffer group may be emptying, said filling and empyting occurring betwwen different ones of said local memory DMA port and one of said peripheral devices, and to permit said accumulator means and said peripheral devices to reference said address-status buffer means.

2. A peripheral interface system for a data processing system including a central processor having a central memory and a plurality of peripheral devices, said peripheral interface system comprising:

I/O processor means including a local memory having a DMA port for transmitting and receiving data and including accumulator means for transmitting and receiving control information;

channel multiplexer means communicating with said DMA port and said accumulator means and providing a plurality of data and control information channels between said I/O processor means and a corresponding number of peripheral devices;

a plurality of controller means each one communicating with one of said peripheral devices and with said channel multiplexer means, each of said controller means including:

(a) first and second data buffers each including a plurality of registers for holding data parcels;

(b) data multiplexing means communicating with said channel multiplexer means and said one peripheral device for multiplexing data parcels into and out of said first and second data buffers from or to either of said one peripheral device or said channel multiplexer means; and (c) control logic means communicating with said channel multiplexer means and said one peripheral device for controlling said data multiplexing means and addressing said buffer means to cause said first and second data buffer means to empty and fill alternately so that one may be filling while the other emptying, said filling and emptying occurring between different ones of said channel multiplexer means and said one peripheral device.

3. A peripheral interface system according to claim 2 wherein said controller means is functionally active to communicate with said channel multiplexer means periodically on a revolving time multiplexed basis, and wherein said channel multiplexer means initiates said active communication period.

4. A peripheral interface system according to claims 3 wherein a predetermined plurality of data parcels are transferred between said channel multiplexer means and said controller means during each communication period, said predetermined plurality being in number a fraction of the number of data parcels which may be held in said first or second data buffers.

5. A peripheral interface system according to claim 4 wherein the frequency of occurrence of communication periods between said channel multiplexer means and said controller means is fixed so that the filling or emptying of one of said first and second data buffers from or to said channel multiplexer means normally proceeds at a rate exceeding the rate of filling or emptying of the other of said data buffers to or from said one peripheral device.

6. A peripheral interface system according to claim 5 wherein said one peripheral device transmits and receives data parcels in streams, said streams each comprising a predetermined plurality of data parcels, one of said streams transferred between the controller means and said one peripheral device in response to a single request signal generated by said control logic means, and wherein said first and second data buffers are sized to hold a predetermined plurality of streams.

7. A peripheral interface system according to claim 2 wherein said control logic means includes first and second addressing controls for referencing said first and second data buffers, said first and second addressing controls being multiplexed to either of said buffer means via first and second address multiplexers associated with said first and second data buffers respectively, one of said addressing controls providing references for data parcels transmitted to or received from said one peripheral device and the other of said addressing controls providing references for data parcels transmitted to or received from said channel multiplexer means.

8. A peripheral interface system according to claim 2 wherein said data parcels are communicated between said data multiplexing means and said one peripheral device through a bus-in parallel data path carrying data parcels from said one peripheral device to said data multiplexing means and a bus-out parallel data path carrying data parcels from said data multiplexing means to said one peripheral device.

9. A peripheral interface system according to claim 8 wherein said data parcels are communicated between said data multiplexing means and said channel multiplexer means through an output parallel data path carrying data parcels from said data multiplexing means to said channel multiplexer means and an output parallel data path carrying data information units from said channel multiplexer means to said data multiplexing means.

10. A peripheral interface system for use a data processing system including a central processor having a central memory and a plurality of peripheral devices, said peripheral interface system comprising:

I/O processor means communicating with said central processor and including a local memory having a DMA port for transmitting and receiving data and further including accumulator means for transmitting and receiving control information;

channel multiplexer means communicating with said DMA port and said accumulator means for providing a plurality of channels for moving data and control information to and from said DMA port and accumulator means on a revolving time multiplexed basis;

said channel multiplexer means including a control information buffer and a pair of multiplexer data buffers, each of said buffers being function-wise divided into groups, one group from each buffer being dedicated to the movement of control or data information for a particular one of said plurality of channels, and including channel multiplexer control means for operating a pair of channel corresponding groups of registers in said pair of multiplexer data buffers to cause one of said group pair to fill with a first predetermined number of data parcels and to cause a first predetermined number of parcels to empty from the other of said group pair, said filling and emptying occurring between different ones of said I/O processor means DMA port and one of said peripheral devices and for operating said control information buffer to permit one of said peripheral devices and said accumulator means to reference one of said control information buffer groups during an active period of the channel associated with said groups;

a plurality of controller means, each one communicating with one of said channel multiplexer means channels and with one of said peripheral devices each of said controller means including first and second controller data buffers each sized to hold a second predetermined number data parcels, said second predetermined number equal to a multiple of said first predetermined number, and including controller multiplexing means for multiplexing data parcels into and out of said first and second controller data buffers to cause one of said controller data buffers to fill while the other empties, said filling and emptying occurring between different ones of said one channel multiplexer means channel and said one peripheral device.

* * * * *

UNITED STATES PATENT AND TRADEMARK OFFICE
CERTIFICATE OF CORRECTION

PATENT NO. : 4,807,121
DATED : 2-21-89
INVENTOR(S) : Robert J. Halford

It is certified that error appears in the above-identified patent and that said Letters Patent is hereby corrected as shown below:

Column 18, line 52, "betwwen" should be --between--;

Column 20, line 15, after "use" insert --with--;

Column 20, line 57, after "number" insert --of--.

Signed and Sealed this

Fourteenth Day of January, 1992

Attest:

HARRY F. MANBECK, JR.

*Attesting Officer*   *Commissioner of Patents and Trademarks*